United States Patent
Worrall et al.

(10) Patent No.: US 9,877,235 B2
(45) Date of Patent: Jan. 23, 2018

(54) METHOD AND SYSTEM FOR SETUP OR MODIFICATION OF DATA FLOWS, PRIMARY NODE, SECONDARY NODE, UE AND COMPUTER PROGRAM PRODUCT

(71) Applicant: Alcatel Lucent, Boulogne Billancourt (FR)

(72) Inventors: Chandrika K. Worrall, Swindon (GB); Sudeep K. Palat, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/911,085

(22) PCT Filed: Jul. 21, 2014

(86) PCT No.: PCT/EP2014/001995
§ 371 (c)(1),
(2) Date: Feb. 9, 2016

(87) PCT Pub. No.: WO2015/018493
PCT Pub. Date: Feb. 12, 2015

(65) Prior Publication Data
US 2016/0192244 A1 Jun. 30, 2016

(30) Foreign Application Priority Data

Aug. 9, 2013 (EP) .................................... 13360022

(51) Int. Cl.
*H04W 36/00* (2009.01)
*H04W 28/02* (2009.01)
*H04W 28/08* (2009.01)

(52) U.S. Cl.
CPC ... *H04W 36/0027* (2013.01); *H04W 28/0236* (2013.01); *H04W 28/08* (2013.01)

(58) Field of Classification Search
None
See application file for complete search history.

(56) References Cited

U.S. PATENT DOCUMENTS

| 2014/0204771 A1* | 7/2014 | Gao | H04W 36/28 370/252 |
| 2014/0219248 A1* | 8/2014 | Reddiboyana | H04W 36/14 370/331 |
| 2014/0254476 A1* | 9/2014 | Blankenship | H04L 47/20 370/328 |

(Continued)

OTHER PUBLICATIONS

Ericsson et al, "Impact of small cell enhancements to RRC functions", 3GPP TSG-RAN WG2 #82, R2-131672, May 2013.

(Continued)

*Primary Examiner* — Raj Jain
*Assistant Examiner* — Jamaal Henson
(74) *Attorney, Agent, or Firm* — Fay Sharpe, LLP (57) ABSTRACT

A method, in a radio communication system, for setup or modification of data flows between user equipment (UE) in dual connectivity with a primary node and a secondary node of the system, comprising switching a data path between the primary node and the secondary node by transmitting message data between the primary node and secondary node to establish a direct user plane path between the secondary node and a serving gateway (S-GW) of the system.

13 Claims, 10 Drawing Sheets

(56) References Cited

U.S. PATENT DOCUMENTS

2014/0355562 A1* 12/2014 Gao ................. H04W 76/025
370/331

OTHER PUBLICATIONS

CATT, UE Context Transfer and the CN Signalling for Different Traffic Types[online], 3GPP TSG-RAN WG2#81bis R2-130980, Internet <URL:http://www.3gpp.org/ftp/tsg_ran/WG2_RL2/TSGR2_81bis/Docs/R2-130980.zip>, Apr. 5, 2013.

ETRI, Considerations on Network Architecture for Dual Connectivity[online], 3GPP TSG-RAN WG2#81bis R2-131185, Internet <URL:http://www.3gpp.org/ftp/tsg_ran/WG2_RL2/TSGR2_81bis/Docs/R2-131185.zip>, Apr. 5, 2013.

Intel Corporation, Mobility mechanisms minimizing UE context transfer & signalling to CN[online], 3GPP TSG-RAN WG2#81bis R2-131407, Internet <URL:http://www.3gpp.org/ftp/tsg_ran/WG2_RL2/TSGR2_81bis/Docs/R2-131407.zip>, Apr. 6, 2013.

Nokia Corporation et al., "Discussion on different backhaul alternatives for small cell enhancements," $3^{rd}$ Generation Partnership (3GPP), 3GPP TSG-RAN WG2 Meeting #82, R2-131907, 5 pages, XP050700084, Fukuoka, Japan, May 20-27, 2013.

InterDigital Communications, "Discussion on S1 split for dual connectivity," $3^{rd}$ Generation Partnership (3GPP), 3GPP TSG-RAN WG2 Meeting #82, R2-131919, pp. 1-6, XP050699939, Fukuoka, Japan, May 20-24, 2013.

Nokia Siemens Networks (Rapporteur), "Email Discussion Report on U-Plane Alternatives [81bis#19]," $3^{rd}$ Generation Partnership (3GPP), 3GPP TSG-RAN WG2 Meeting #82, R2-131621, 38 pages, XP050699806, Fukuoka, Japan, May 20-24, 2013.

Alcatel-Lucent Shanghai Bell et al., "Discussion on the RRC protocol supporting dual connectivity," $3^{rd}$ Generation Partnership (3GPP), 3GPP TSG RAN WG2 Meeting #81bis, R2-131352, pp. 1-3, XP050699499, Chicago, USA, Apr. 15-19, 2013.

Alcatel-Lucent, "Control Plane Architecture for Small Cell Enhancement dual connectivity," $3^{rd}$ Generation Partnership (3GPP), 3GPP TSG-RAN WG2 Meeting #82, R3-131742, 4 pages, XP050719914, Venice, Italy, Oct. 7-11, 2013.

International Search Report for PCT/EP2014/001995 dated Aug. 28, 2014.

* cited by examiner

METHOD AND SYSTEM FOR SETUP OR MODIFICATION OF DATA FLOWS, PRIMARY NODE, SECONDARY NODE, UE AND COMPUTER PROGRAM PRODUCT

TECHNICAL FIELD

The present invention relates to a method, in a radio communication system comprising a user equipment in dual connection with a primary node and a secondary node, a telecommunications system, a primary node, a secondary node and to a user equipment.

BACKGROUND

Small Cells are low power, low-cost base stations that are able to provide cellular service in residential or enterprise environments, with a typical coverage range of tens of meters. They have auto-configuration and self-optimization capabilities that enable a simple plug and play deployment, and are designed to automatically integrate themselves into an existing macrocellular network. Small cells, often referred to as pico cells, or metro cells, typically use a customer's broadband interne connection, for example DSL, cable or the like, as backhaul towards the macrocellular network. Support of non-ideal backhaul (with one way latency of few milliseconds to few tens of milliseconds) between small cells and between small cell and macro cells is considered as the typical deployment scenario.

Small cell deployment for handling capacity needs in high traffic areas, such as hot spot areas, is an area of investigation. A proposal for handling capacity needs in high traffic areas is to provide dual connectivity support for user equipment. Dual connectivity support allows a User Equipment (UE) to be concurrently connected to a macro cell and a small cell, or macro cell to two small cells for example. A UE can thus be connected to and served by more than one cell at a time. Dual connectivity support is considered as a way to enable offloading of traffic when required.

SUMMARY

According to an example, there is provided a method, in a radio communication system, for setup or modification of data flows between user equipment (UE) in dual connectivity with a primary node and a secondary node of the system, comprising switching a data path between the primary node and the secondary node by transmitting message data between the primary node and secondary node to establish a direct user plane path between the secondary node and a serving gateway (S-GW) of the system.

Switching a data path can include determining if a traffic bearer should be offloaded from the primary node to the secondary node or vice versa on the basis of radio measurements between the UE and the primary and secondary nodes. A radio resource control (RRC) entity can be provided at one or both of the primary and secondary nodes for communication with the UE. The RRC entity at the primary node, if present, can perform mobility related control and signalling and radio bearer related signalling for a data flow supported over the primary node. The RRC entity at a node, if present, can perform radio bearer related configuration for an offloaded data flow over the corresponding node.

According to an example, there is provided a radio telecommunication system comprising a primary node, a secondary node, a UE in dual connectivity with the primary node and a secondary node of the system, the system operable to switch a data path between the primary node and the secondary node by transmitting message data between the primary node and secondary node to establish a direct user plane path between the secondary node and a serving gateway (S-GW) of the system. The system can be operable to determine if a traffic bearer should be offloaded from the primary node to the secondary node or vice versa on the basis of radio measurements between the UE and the primary and secondary nodes. An RRC entity at one or both of the primary and secondary nodes can communicate with the UE. The RRC entity at the primary node, if present, can be operable to execute mobility related control and signalling and radio bearer related signalling for a data flow supported over the primary node. The RRC entity at a node, if present, can be operable to execute radio bearer related configuration for an offloaded data flow over the corresponding node.

According to an example, there is provided a primary node of a radio telecommunication system as provided above, operable in a dual connectivity link with a UE. According to an example, there is provided a secondary node of a radio telecommunication system as provided above, operable in a dual connectivity link with a UE. According to an example, there is provided a UE in dual connectivity with a primary node and a secondary node of a system as provided above.

According to an example, there is provided a UE in dual connectivity with a primary node and a secondary node of a system, the UE operable in accordance with the method as provided above.

According to an example, there is provided a computer program product, comprising a computer usable medium having computer readable program code embodied therein, said computer readable program code adapted to be executed to implement a method, in a radio communication system, for setup or modification of data flows between user equipment in dual connectivity with a primary node and a secondary node of the system as provided above.

BRIEF DESCRIPTION OF THE DRAWINGS

Embodiments will now be described, by way of example only, with reference to the accompanying drawings, in which.

DETAILED DESCRIPTION

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Typically, a legacy system depends on UE identification via a network allocated identifier while the UE is connected to the network. The identifier is allocated to the UE during initial access to the network, and when the UE moves to another cell of the network, a new one is allocated. The UE is addressed using the identifier for all communication between the UE and a node which assigns the identifier. Maintaining the same identifier is possible as the UE is connected to only one node at a time.

Figure 1:
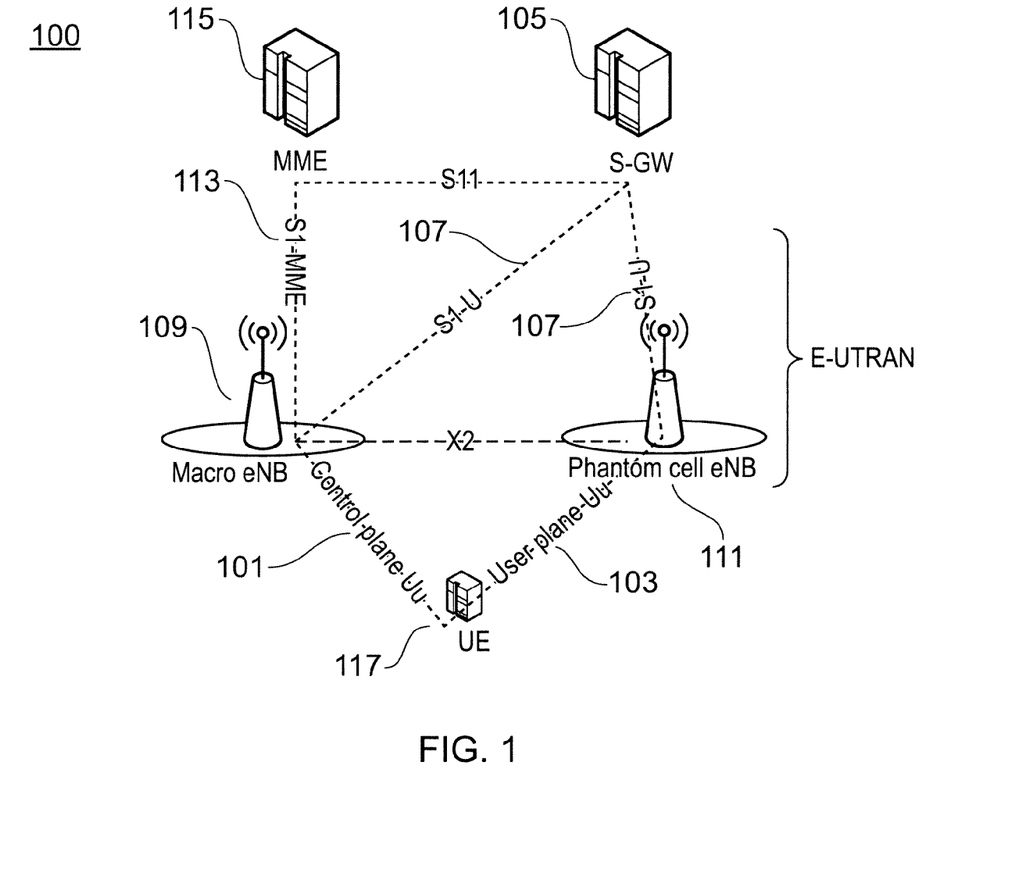
FIG. 1 is a schematic representation of an architecture according to an example.

There are number of protocol architecture options in support of user plane 103 and control plane 101 for dual connectivity support for a UE 117. One most likely acceptable network architecture 100 is to have the offloading traffic split at the core network (serving gateway, S-GW, 105). FIG. 1 is a schematic representation of such an architecture. An S1-U interface connection 107 is established towards a primary node, such as macro eNB 109 and a secondary node such as small cell eNB 111 at the same time, while S1-MME 113 is established between the macro eNB 109 and MME 115.

Figure 2:
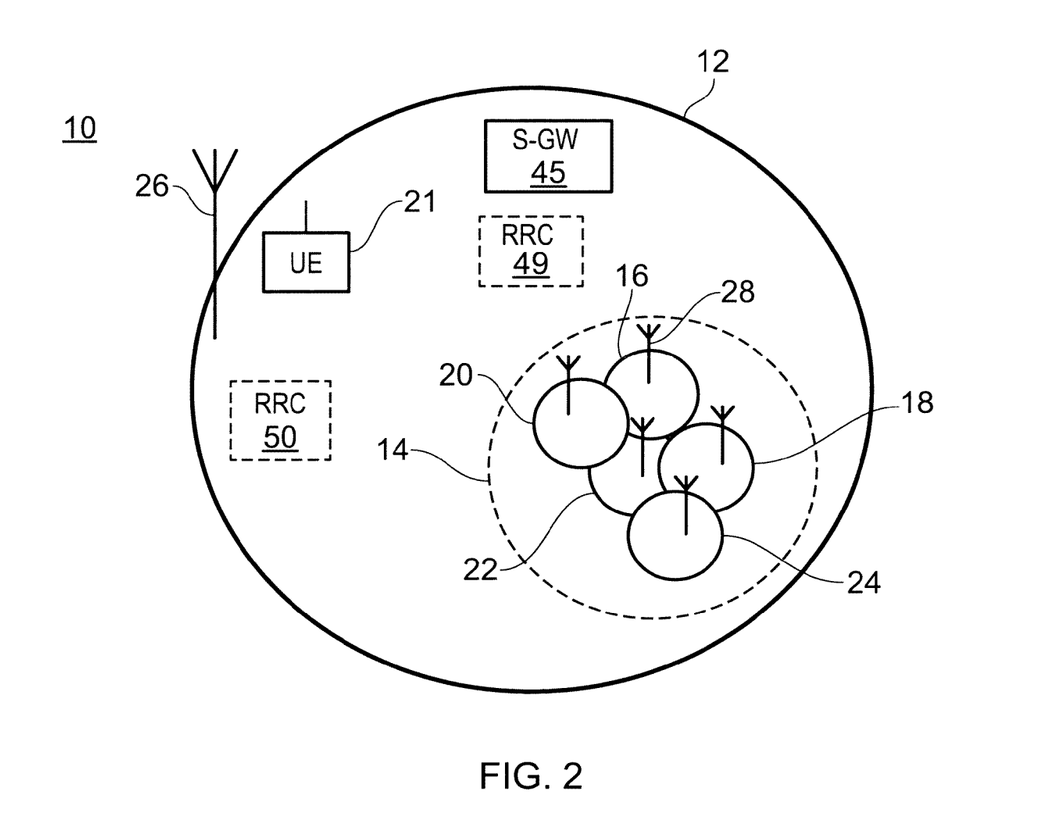
FIG. 2 is a schematic representation of a heterogeneous telecommunications system according to an example.

FIG. 2 is a schematic representation of a heterogeneous telecommunications system 10 comprising a macro cell 12 and a cluster of small cells 14. The cell 12 and respective ones of the cells in the cluster of small cells 14 are served by E-UTRAN Node Bs, also known as Evolved Node Bs (herein "eNB", also interchangeably referred to as "nodes") which form the hardware that is connected to the radio communication network that communicates directly with mobile handsets, known as user equipment (UE).

The cluster of small cells 14 comprises a first small cell 16, a second small cell 18, a third small cell 20, a fourth small cell 22 and a fifth small cell 24. The small cells are distributed geographically to provide an area of coverage within the macro cell 12. UE 21 may roam through the network 10. When the user equipment is located within the macro cell 12, communications may be established between the user equipment and the macro cell base station 26 over an associated radio link. If the user equipment is located geographically within one of the small cells 16, 18, 20, 22 and 24, communications may be established between the user equipment and the base station of the associated small cell over an associated radio link. It will be appreciated that FIG. 2 shows only an example heterogeneous network and that a plurality of macro cells may be provided, more or less than five small cells may be provided and a plurality of small cell clusters may be provided.

As described above, within the macro cell 12, there is provided multiple small cell base stations which provide a plurality of small cells 16, 18, 20, 22, and 24. The small cells provide local communications coverage for a user in their vicinity. As a user equipment comes within range of a small cell, such as the first small cell 16, a handover may occur between the base station 26 of the macro cell and the base station 28 of the small cell, such as when the base station of the small cell detects that user equipment has come within range. Likewise, as a user equipment comes within range of a different small cell, a handover may occur between the base station of the current small cell and the base station of the new small cell when the base station of the new small cell detects that user equipment has come within range.

In order to handle the capacity needs of a high traffic area, a user equipment in the telecommunications network 10 of FIG. 2 may be provided with dual connectivity support. That is, a user equipment may be connected to both the macro cell 12 and the small cell 16. Also, it should be appreciated that a user equipment may be dual connected to macro cell 12 and small cells 16 and 18, or to small cell 16 and any of the other small cells 18 to 24.

Dual connectivity as described with reference to FIG. 1 can be used to enable offloading of traffic via small cell when required. For example, a data flow associated with a specific service in use by the user equipment can be offloaded to a small cell in high traffic areas that may otherwise cause the macro cell 12 to become overloaded for example.

For efficient scheduling support a traffic offloading decision is likely to be made at the radio access network (RAN), and take into account parameters such as channel quality and RAN load information. Moreover, an offloading trigger may be initiated by the macro eNB or small cell eNB (eg: based on the cell load). It is commonly assumed that the legacy handover (HO) related signaling procedure could also be used in the establishing, modifying and release of the traffic offloading bearers. However, due the following conditions, the legacy HO procedure could not be used as such for traffic offloading bearer management:

1). In a legacy HO procedure, both the source and the target eNB have connection to an MME during the HO process. However in dual connectivity, only the anchoring/primary eNB (e.g. the macro eNB) has a connection to the MME, while small cell eNB has no connection to MME. Therefore, path switch communication between the small cell and the S-GW should be communicated via the macro eNB and MME. This requires new signaling messages between the small cell eNB and the macro cell eNB.

2). In a legacy HO procedure, the decision making eNB (source eNB) has all the bearers being delivered to the UE prior to the HO. However with dual connectivity this is not the case. For example some data bearers that were offloaded via the small cell eNB, and the macro eNB makes the decision to modify the bearers such that offloaded bearers over small cell now to be delivered over the macro cell.

In an example, there is provided a method and system for establishing and modifying offloaded bearers considering the core network (CN) based bearer split and single S1-MME termination point.

In order to solve the problem of not having connection to the MME from small cell eNB while establishing direct data path to the S-GW, a new procedure is introduced that allows switching of a data path between the macro cell and small cell with minimal interruption. In an example, this is done by adapting the current HO procedure for this case and introduction of a new message. The new message between the macro eNB and the small cell eNB is used to convey the information necessary to establish a direct user plane path between the small cell eNB and the S-GW.

In order to solve the problem of having a different node making the decision for the offloading modification while not having S1-U link for the offloaded bearers at the decision entity, new messages are introduced between the small cell eNB and the macro cell eNB. The procedure of the new message (trigger, initiation and the information delivery to the UE) depends on the control plane architecture options. However, a method according to an example can be adopted for multiple different CP protocol architecture options.

Figure 3:
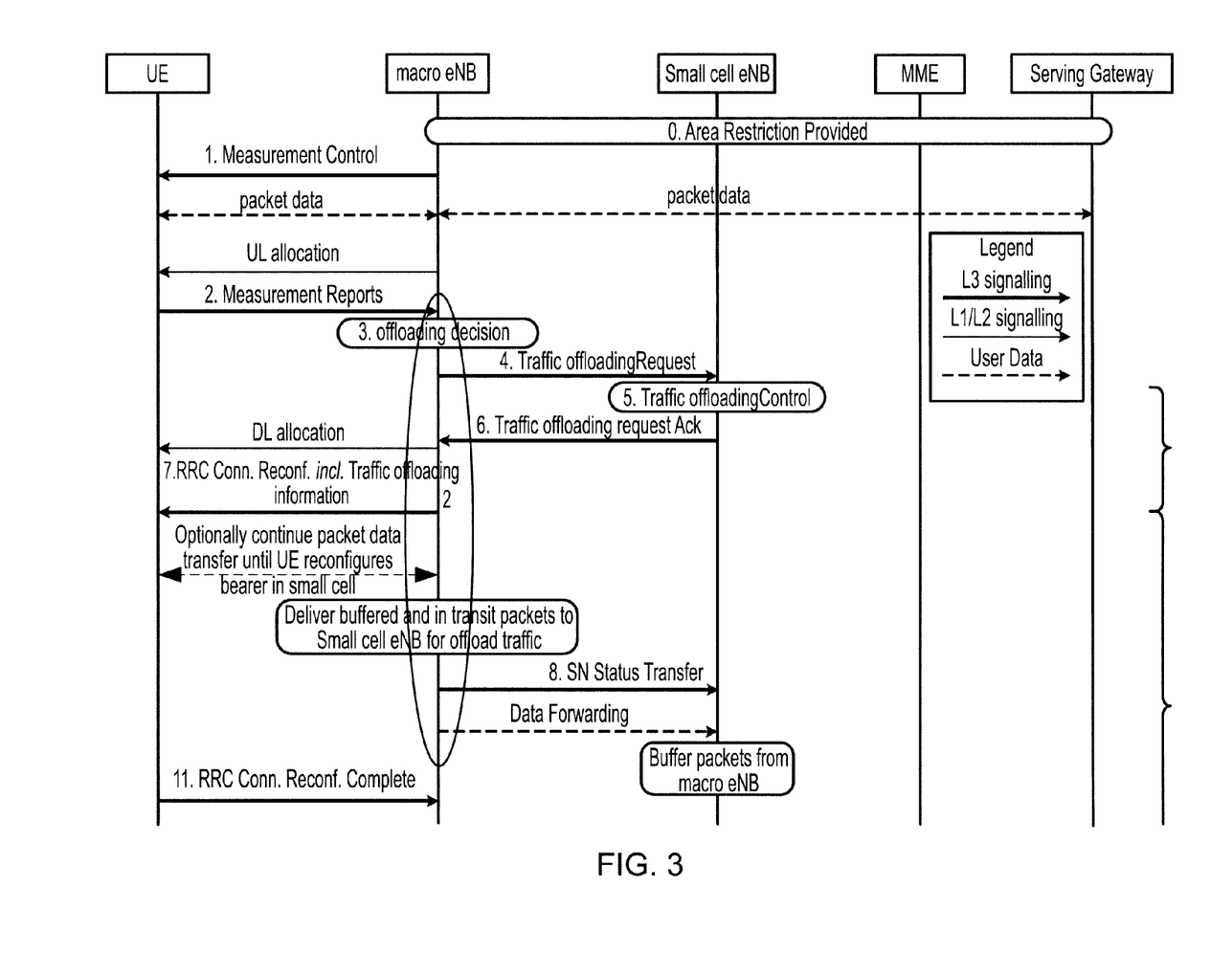
FIG. 3 is a schematic representation of a legacy handover procedure according to an example.

FIG. 3 is a schematic representation of a legacy handover procedure. Problem areas are circled and marked 1 and 2 in FIG. 3. Note that in circle 1, the path switch request is sent by the target eNB, however with dual connectivity, there is no MME connection from a small cell, hence the small cell cannot initiate the path switch procedure.

Figure 4:
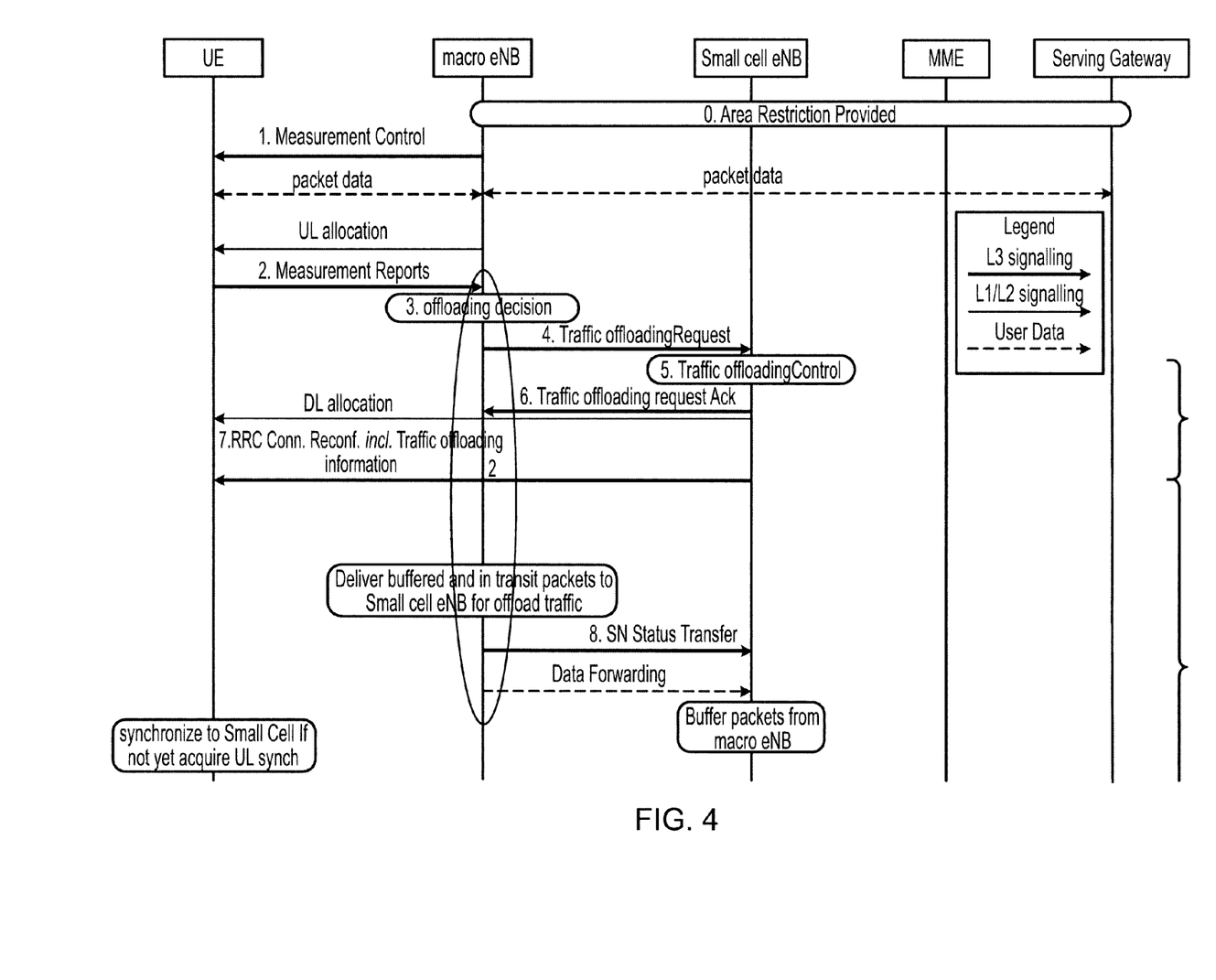
FIG. 4 is a schematic representation of a offloading process according to an example.

FIG. 4 is a schematic representation of a offloading process according to an example for offloading a barer from the macro eNB to the small cell eNB. Impacted and newly introduced messages are highlighted. A traffic bearer offloading decision is made by the macro eNB based on measurement reports (e.g. measurements on the macro and small cell relating to radio parameters such as signal strength and load and so on) and/or load of the current and small cell. The macro eNB sends a traffic offloading request in step 4 to the small cell. The message may contain parameters such as UE X2 signalling context reference at macro eNB, small cell ID, KeNB*, RRC context including the C-RNTI of the UE in the macro eNB, AS-configuration, E-RAB context for the offloaded traffic. The UE X2 signalling context reference at macro eNB, small cell BD, KeNB*, RRC context of the UE in the macro eNB may be included for the configuration of the small cell for traffic offloading for the first time. Subsequently, some of the parameters, such as E-RAB associated parameters can be included for the subsequent traffic offloading modifications. The E-RAB context includes necessary RNL and TNL addressing information and QoS profile of the offloaded E-RABs.

Upon completion of the traffic offload control (eg: admission control for offloaded traffic) by the small cell eNB, the traffic offloaded request ack is sent to the macro eNB. The message may include the small cell security algorithm identifiers for offloaded traffic bearers, and may also include RNL/TNL information for the forwarding tunnels if necessary. Additionally, the message may convey the lower protocol layer configuration for the offloaded bearers as decided by the small cell radio resource management. The macro eNB transmits some of the received information to the UE. An RRC connection reconfiguration message may be used. If not, a new RRC message could be used. The UE transmits acknowledgement message to the macro eNB. Note that RRC is located at the macro eNB. The macro eNB forwards the acknowledgment message or sends the information of that the UE is ready for the traffic offloading to the small cell.

If the UE is not yet synchronized to the small cell, the UE performs the downlink/uplink (DL/UL) synchronization procedure towards the small cell eNB.

The small cell initiates the path switch request for the offloaded DL bearers. This can be a new message transmitted from the small cell eNB to the macro eNB informing the small cell identity and tunnel end point related information for the offloaded bearers. Based on the information received by the macro eNB, the macro eNB generates the path switch message for the small cell towards the MME.

On the other hand, the message can be the path switch message similar to that in legacy networks and the message is transmitted to the MME via macro eNB for example, in a transparent container. Note also that the MME which the small cell connected to for the standalone UE support may be different from the MME which the macro eNB connected to. In this case the details of the identity to establish an S1-U connection between the small cell eNB and the serving GW for offloaded EPS bearers can be provided to and from the small cell.

The message may include the small cell identification (eg: TAI and ECGI of the small cell) and the list of EPS bearers to be switched. The message is sent to the macro eNB which forwards the message to the MME. The MME sends the modify bearer request message to the S-GW. The message informs the MME/S-GW of that the traffic bearer termination point has been changed to the small cell, thus S1-U path switch for the offloaded bearers are performed. The Serving GW starts sending downlink packets to the target eNodeB using the newly received address and TEIDs. The path switch Ack message from the macro eNB to the small cell eNB conveys the modified bearer information (if any) and the UL TEID (if changed) which are received from the S-GW/MME to the small cell for offloaded bearers.

The offload decision is made by the macro eNB based on the small cell channel quality, macro cell channel quality, the small cell traffic load and/or the macro eNB traffic load. The small cell load information in one embodiment can be provided to the macro eNB via an Xn or X2 interface. In another embodiment, the small cell requests the offload bearer modification from the macro eNB.

This presumes that a single RRC is used to communicate to the UE. Another CP protocol option is to have two RRC entities at the macro and small cell eNB for communication to the UE. The RRC at the macro cell performs the mobility related control and signalling and radio bearer related signalling for the bearers supported over the macro eNB. The RRC at the small cell eNB handles the radio bearer related configuration for the offloaded bearers over the small cell.

Figure 5:
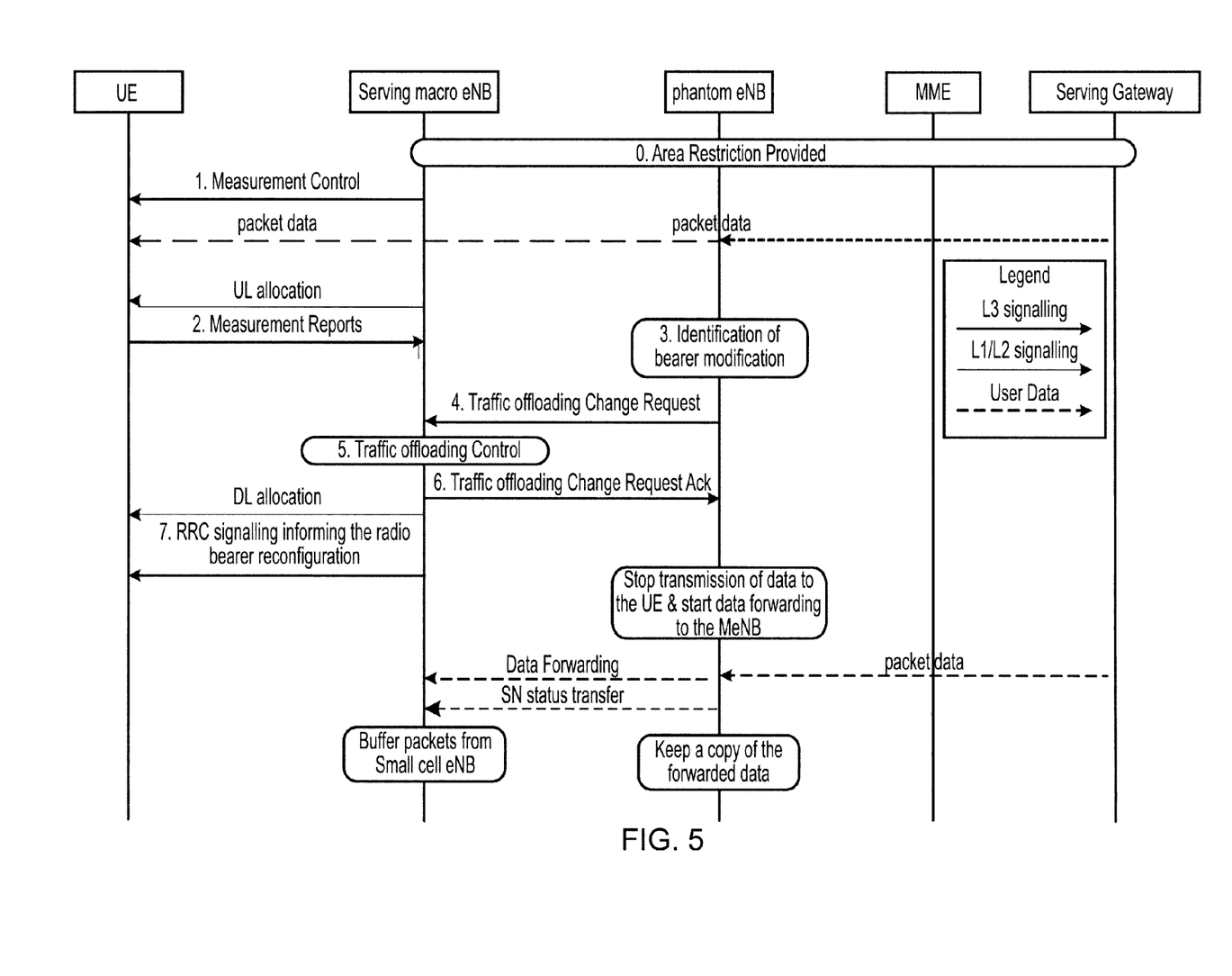
FIG. 5 is a schematic representation of a process according to an example.

FIG. 5 is a schematic representation of a process according to an example, and illustrates signalling modification (compared to the single RRC as described with reference to FIG. 3) when considering two RRCs communicating to the UE. The modified signalling is highlighted. A difference is that the RRC connection reconfiguration and Complete messages are sent to the small cell directly after gaining UL synchronisation to the small cell eNB.

The second problem identified is how to handle the fact that the offload decision is made by the macro eNB in such a way so as to bring back the offloaded traffic to be transmitted over the macro eNB. Some reasons to bring the offloaded traffic back to the macro eNB are, the small cell channel quality get worse, the small cell traffic load increases, the macro eNB traffic load decreases. The small cell load information in one embodiment can be provided to the macro eNB via Xn or X2 interface.

Figure 6:
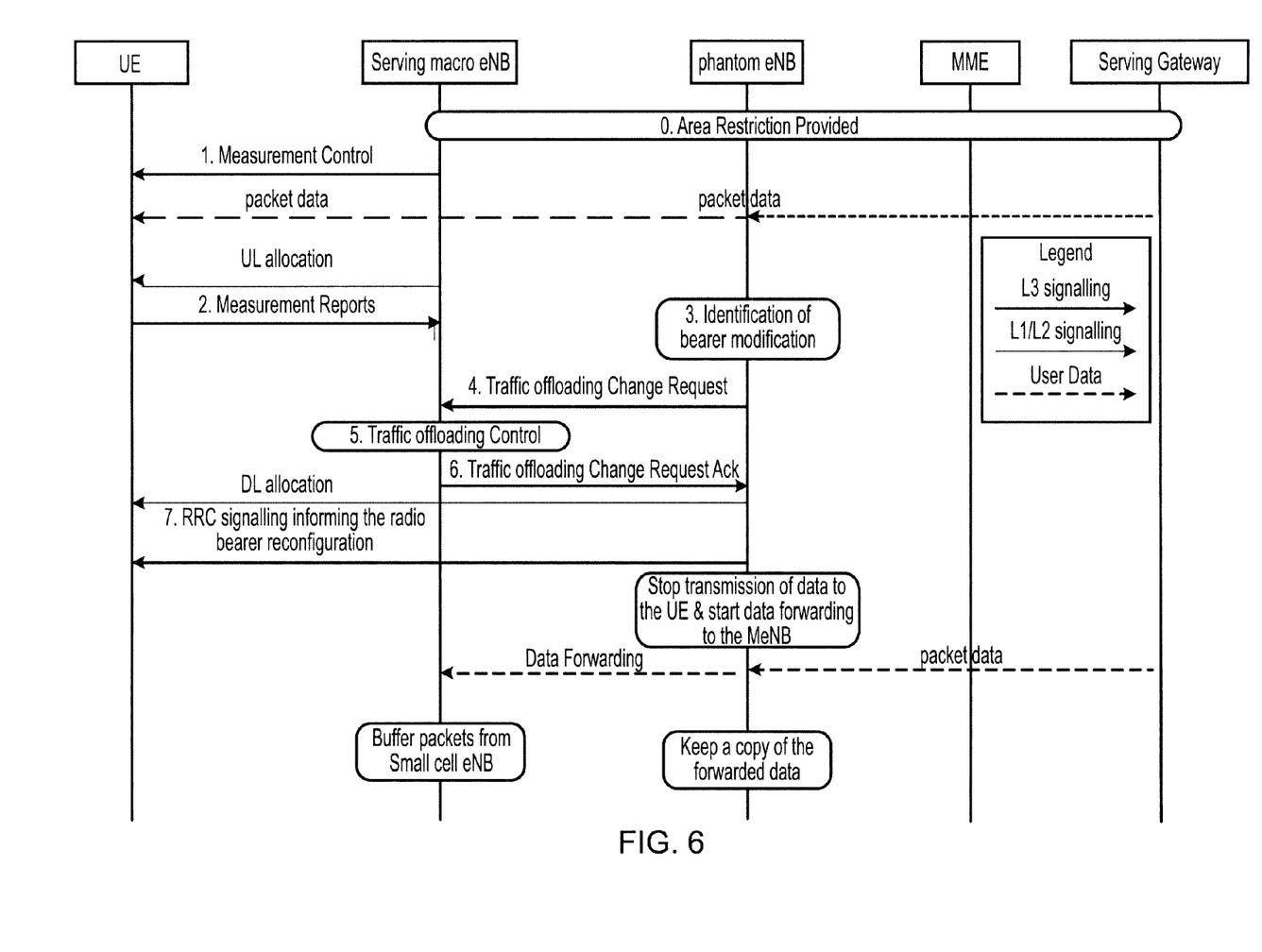
FIG. 6 is a schematic representation of a process according to an example.

In another embodiment, the small cell requests the offload bearer modification from the macro eNB. The signalling flow depends on the control plane architecture used. One possible embodiment is shown in FIG. 6, which is a schematic representation of a process according to an example. FIG. 6 illustrates the DL and UL offload bearer modification considering two RRC located at the macro and small cell eNBs. The UE communicates RRC messages to both macro and small cell eNBs.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method, in a radio communication system, for setup or modification of data flows between user equipment (UE) in dual connectivity with a primary node and a secondary node of the radio communication system, comprising:
switching a data path between the primary node and the secondary node by:
transmitting a traffic offload request from the primary node to the secondary node;
transmitting a path switch request message from the secondary node to the primary node, the path switch request message including tunnel-end point related information for an offloaded bearer; and
transmitting another path switch request message for the secondary node from the primary node towards a mobility management entity (MME), the another path switch request message including tunnel-end point related information for an offloaded bearer;
wherein the transmitting the another path switch request message establishes a direct user plane path between the secondary node and a serving gateway (S-GW) of the radio communications system by transmitting a modify bearer request message from the MME to the S-GW.

2. The method of claim 1, wherein the switching the data path includes determining if a traffic bearer should be offloaded from the primary node to the secondary node or vice versa on the basis of radio measurements between the UE and the primary and secondary nodes.

3. The method of claim 1, wherein a radio resource control (RRC) entity is provided at one or both of the primary and secondary nodes for communication with the UE.

4. The method of claim 3, wherein the RRC entity at the primary or secondary nodes performs radio bearer related configuration for an offloaded data flow over the corresponding node.

5. The method of claim 1, wherein a radio resource control (RRC), entity for communication with the UE is at the primary node, and performs mobility related control and signalling and radio bearer related signalling for a data flow supported over the primary node.

6. A computer program product, comprising a non-transitory computer usable medium having computer readable program code embodied therein, said computer readable program code adapted to be executed to implement the method of claim 1.

7. A radio telecommunication system comprising:
a primary node;
a secondary node;
a UE in dual connectivity with the primary node and the secondary node of the radio communication system;
the system operable to switch a data path between the primary node and the secondary node by:
transmitting a traffic offload request form the primary node to the secondary node;
transmitting a path switch message from the secondary node to the primary node, the path switch request message including tunnel end point related information for an offloaded bearer; and
transmitting another path switch request message for the secondary node from the primary node towards a mobility management entity (MME), the another path switch request message including tunnel-end point related information for an offloaded bearer; wherein the transmitting the another patch switch request message establishes a direct user plane path between the secondary node and a serving gateway (S-GW) of the radio communication system by transmitting a modify bearer request message from the MME to the S-GW.

8. The system of claim 7, further operable to determine if a traffic bearer should be offloaded from the primary node to the secondary node or vice versa on the basis of radio measurements between the UE and the primary and secondary nodes.

9. The system of claim 7, further comprising an RRC entity at one or both of the primary and secondary nodes to communicate with the UE.

10. The system of claim 9, wherein the RRC entity at the primary or secondary nodes is operable to execute radio bearer related configuration for an offloaded data flow over the corresponding node.

11. The system of claim 7, wherein a radio resource control (RRC) entity is at the primary node, and the RRC is operable to:
communicate with the UE; and
execute mobility related control and signalling and radio bearer related signalling for a data flow supported over the primary node.

12. A primary node operable in a dual connectivity link with a UE, the primary node configured to:
switch a data path between the primary node and a secondary node by being configured to:
transmit a traffic offload request from the primary node to the secondary node;
receive a path switch request message from the secondary node, the path switch request message including tunnel end point related information for an offloaded bearer;
and transmit another path switch message for the secondary node towards a mobility management entity (MME), the another path switch request message including tunnel-end point related information for an offloaded bearer;
wherein the transmitting the another path switch request message establishes a direct user plane path between the secondary node and a serving gateway (S-GW) of a radio communication system by transmitting a modify bearer request message from the MME to the S-GW.

13. A secondary node, operable in a dual connectivity link with a UE, the secondary node configured to:
switch a data path between a primary node and the secondary node by being configured to:
receive a traffic offload request from the primary node;
transmit a path switch request message the primary node, the path switch request message including tunnel end point related information for an offloaded bearer; and
cause another path message for the secondary node to be transmitted from the primary node, the path switch request message sent towards a mobility management entity (MME), the another path switch request message including tunnel-end point related information for an offloaded bearer;

wherein the transmitting the another path switch request message establishes a direct user plane path between the secondary node and a serving gateway (S-GW) of a radio communications system by transmitting a modify bearer request message from the MME to the S-GW.

\* \* \* \* \*